(12) United States Patent
Labasque et al.

(10) Patent No.: US 6,820,432 B2
(45) Date of Patent: Nov. 23, 2004

(54) METHOD OF OPERATING A HEAT RECOVERY BOILER

(75) Inventors: Jacques Labasque, Champigny s/Marne (FR); Jacques Segret, Paris (FR)

(73) Assignee: L'Air Liquide, S.A., Paris (FR)

( * ) Notice: Subject to any disclaimer, the term of this patent is extended or adjusted under 35 U.S.C. 154(b) by 81 days.

(21) Appl. No.: 10/378,427

(22) Filed: Mar. 3, 2003

(65) Prior Publication Data

US 2003/0172656 A1 Sep. 18, 2003

(30) Foreign Application Priority Data

Mar. 12, 2002 (FR) .............................. 02 03068

(51) Int. Cl.[7] .................................. F02C 6/04
(52) U.S. Cl. ..................... 60/783; 60/784; 431/115
(58) Field of Search ................... 60/772, 783, 784, 60/39.182; 431/115

(56) References Cited

U.S. PATENT DOCUMENTS 4,926,765 A * 5/1990 Dreizler et al. ............. 110/234
4,936,088 A 6/1990 Bell
5,411,394 A 5/1995 Beer et al.
6,095,792 A * 8/2000 Berger et al. ................ 431/9
6,572,674 B1 * 6/2003 Avart et al. ................ 75/433

FOREIGN PATENT DOCUMENTS

| DE | 1173293 B | 7/1964 |
| EP | 0884468 A2 | 12/1998 |
| EP | 1028301 A1 | 8/2000 |
| JP | 9-287418 | 11/1997 |

OTHER PUBLICATIONS

French Search Report to FR 02 03068.

* cited by examiner

*Primary Examiner*—Ehud Gartenberg
(74) *Attorney, Agent, or Firm*—Linda K. Russell

(57) ABSTRACT

The heat recovery boiler (1) is operated, at least temporarily, by feeding its combustion system with air (13) and with a stream (15) of flue gases (4) recycled to a level of at least 45%, typically between 50 and 65%, so as to allow the efficiency of the boiler to be increased and to decouple it, at least temporarily, from the combustion engine (8) driving a generator (9), the exhaust gases from which are burnt in post-combustion mode in the boiler in cogeneration mode.

24 Claims, 1 Drawing Sheet

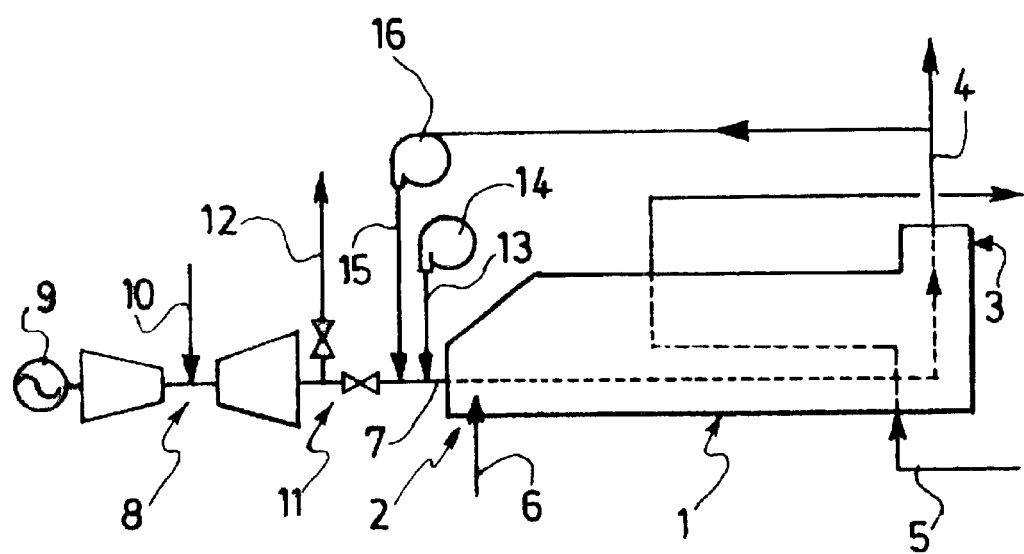

METHOD OF OPERATING A HEAT RECOVERY BOILER

The present invention relates to methods of operating heat recovery boilers suitable for the combustion of at least one fuel with an incoming stream formed from a stream of hot gases and/or a stream of air, in particular in units for the cogeneration of electricity and heat, typically in the form of steam.

More specifically, the object of the present invention is to provide an improved method, allowing greater flexibility in the use of the boiler and to increase the thermal efficiency thereof, especially in the case of temporary or prolonged decoupling between heat production and electricity production.

To do this, according to one feature of the method according to the invention, between 45 and 80 vol %, advantageously between 50 and 65 vol % and typically between 55 and 65 vol %, of the stream of flue gases produced by the boiler are recycled into the air stream.

According to the invention, substantial recirculation of the flue gases in "air" operating mode makes it possible to utilize the waste heat contained in the flue gases and create a "ballast" of combustion products circulating in the boiler, this ballast increasing the velocity of the flue gases and improving the exchange coefficients, thus making it possible to operate with a low air flow rate, with a very satisfactory thermal efficiency of greater than 90% and possibly exceeding 92%.

In addition, with the method according to the invention the recovery boiler can be used in "fresh air" mode not only temporarily, but continuously, with an optimum efficiency, while maintaining the possibility of subsequently adding an engine or a gas turbine set for driving a generator and delivering the hot gases without requiring to modify the combustion unit of the boiler.

Further features and advantages of the invention will become apparent from the following description of one embodiment, given by way of illustration but implying no limitation, in conjunction with the appended drawing which shows schematically a cogeneration plant for implementing the invention.

The single figures shows a heat recovery boiler 1, comprising an upstream part incorporating a combustion system 2 (not shown in detail) and a downstream part with a flue 3 for removing the stream of flue gases 4 produced during operation of the boiler. The boiler advantageously includes several exchangers, mainly convective exchangers, forming part of at least one heat-transfer fluid circuit 5 producing, as output, at least one hot working fluid, typically steam.

The combustion system 2 is fed with at least one fuel, typically natural gas or syngas, via at least one line 6 and with an oxidizer gas via a line 7.

In operation in cogeneration mode, the stream of oxidizer gas sent into the line 7 consists of a stream of exhaust gases from an engine, typically a gas turbine set 8, driving a generator 9 and having its own fuel feed 10, typically the fuel also being natural gas or syngas. A set of valves or dampers 11 is used to isolate the inlet line 7 from the outlet of the engine 8, the exhaust gases from which may be tapped off to a flue, called a bypass 12.

According one aspect of the invention, running into the line 7, downstream of the set of valves 11, are a line 13, for feeding fresh air slightly compressed by a fan 14, and a line 15, for recycling the flue gases escaping from the flue 3 or tapped off upstream of the economizers in the boiler and slightly compressed by a fan 16. Optionally, the line 15 may run into the line 13.

In the above description, it will be understood that the operation of the plant is as follows:

In cogeneration mode, almost all of the exhaust gases from the gas turbine set 8 are sent into the boiler 1, where these exhaust gases, still containing between 9 and 16% oxygen, are burnt in post-combustion mode with the fuel 6, the flue gases 4 being completely removed.

When it is required to deliver steam into the circuit 5, even if the gas turbine set 8 is not in operation or is idling, the combustion system for the boiler 1 is fed with fresh air via the line 13 and, via the line 15, with a flue gas stream of greater or lesser flow rate depending on the calorific power demanded.

As explained above, with the method according to the invention, the boiler 1 can operate autonomously in "fresh air" mode with an efficiency, for a long period of time, without being associated with the combustion engine 8, the incoming stream consisting exclusively of the mixture of air fed in via the line 13 and the stream of recycled flue gases fed in via the line 15.

The Applicant has found that, with a 45% degree of recirculation of the flue gases, the efficiency of the boiler 1 in "fresh air" mode exceeds 90%, and exceeds 92% with a more than 80% degree of recirculation. In addition, under these conditions, the oxygen contents upstream of the boiler combustion system are similar to those expected in operation with exhaust gases from the combustion engine, which therefore avoids having to use sophisticated burner technologies compatible with the various modes of operation.

Although the invention has been described in relation to particular embodiments, it is susceptible to modifications and alternative embodiments that will be apparent to those skilled in the art within the context of the claims appended hereto.

What is claimed is:

1. Method of operating a heat recovery boiler capable of burning at least one fuel with an incoming stream consisting of a stream of hot gases and/or a stream of air, in which between about 45% and about 80% of the stream of flue gases produced by the boiler are recycled into the air stream.

2. Method according to claim 1, wherein between about 50% and about 65% of the stream of flue gases is recycled into the air stream.

3. Method according to claim 2, wherein between about 55% and about 65% of the stream of flue gases is recycled into the air stream.

4. Method according to claim 1, wherein the stream of flue gases recycled is compressed.

5. Method according to claim 2, wherein the stream of flue gases recycled is compressed.

6. Method according to claim 3, wherein the stream of flue gases recycled is compressed.

7. Method according to claim 1, wherein the hot gases comprise exhaust gases from a combustion engine driving a generator.

8. Method according to claim 2, wherein the hot gases comprise exhaust gases from a combustion engine driving a generator.

9. Method according to claim 3, wherein the hot gases comprise exhaust gases from a combustion engine driving a generator.

10. Method according to claim 4, wherein the hot gases comprise exhaust gases from a combustion engine driving a generator.

11. Method according to claim 5, wherein the hot gases comprise exhaust gases from a combustion engine driving a generator.

12. Method according to claim 6, wherein the hot gases comprise exhaust gases from a combustion engine driving a generator.

13. Method according to claim 1, for the sequenced or simultaneous generation of a hot working fluid and electricity.

14. Method according to claim 2, for the sequenced or simultaneous generation of a hot working fluid and electricity.

15. Method according to claim 3, for the sequenced or simultaneous generation of a hot working fluid and electricity.

16. Method according to claim 4, for the sequenced or simultaneous generation of a hot working fluid and electricity.

17. Method according to claim 5, for the sequenced or simultaneous generation of a hot working fluid and electricity.

18. Method according to claim 6, for the sequenced or simultaneous generation of a hot working fluid and electricity.

19. Method according to claim 7, for the sequenced or simultaneous generation of a hot working fluid and electricity.

20. Method according to claim 8, for the sequenced or simultaneous generation of a hot working fluid and electricity.

21. Method according to claim 9, for the sequenced or simultaneous generation of a hot working fluid and electricity.

22. Method according to claim 10, for the sequenced or simultaneous generation of a hot working fluid and electricity.

23. Method according to claim 11, for the sequenced or simultaneous generation of a hot working fluid and electricity.

24. Method according to claim 12, for the sequenced or simultaneous generation of a hot working fluid and electricity.

* * * * *